United States Patent [19]

Dittrich et al.

[11] Patent Number: 5,070,893
[45] Date of Patent: Dec. 10, 1991

[54] APPARATUS AND METHOD FOR REMOVING WASHCOAT REMAINING IN THE CHANNELS OF FRESHLY COATED MONOLITHIC OR HONEYCOMBED CATALYST CARRIERS AND USE OF THE APPARATUS

[75] Inventors: Ewald Dittrich, Grosskrotzenburg; Reinhard Manner, Maintal-Doernigheim; Gerhard Birtigh, Nidderau; Felix Schmidt, Rheinfelden, all of Fed. Rep. of Germany

[73] Assignee: Degussa Aktiengesellschaft, Frankfurt am Main, Fed. Rep. of Germany

[21] Appl. No.: 305,396

[22] Filed: Feb. 2, 1989

[30] Foreign Application Priority Data

Feb. 6, 1988 [DE] Fed. Rep. of Germany ....... 3803579

[51] Int. Cl.$^5$ .............................................. B08B 3/02
[52] U.S. Cl. ................................... 134/104.4; 134/109; 134/166 C; 134/169 C; 15/408
[58] Field of Search .................. 134/104.2, 104.4, 109, 134/166 C, 168 C, 169 C, 200; 15/316, 408, 304, 312, 318, 353; 55/DIG. 38, 108, 428; 427/232, 235

[56] References Cited

U.S. PATENT DOCUMENTS

| | | | |
|---|---|---|---|
| 987,450 | 3/1911 | Eichelberger et al. | 15/316.1 X |
| 1,264,511 | 4/1918 | Hechenbleikner | 55/DIG. 38 X |
| 1,983,366 | 12/1934 | Harlow | 55/DIG. 38 X |
| 2,208,646 | 7/1940 | Saunders et al. | 134/104.4 X |
| 2,497,171 | 2/1950 | Jones et al. | 15/406 X |
| 2,730,195 | 1/1956 | Roberts | 55/DIG. 38 X |
| 2,936,042 | 5/1960 | Hodson | 15/304 X |
| 3,394,426 | 7/1968 | Knox | 15/406 X |
| 3,623,910 | 11/1971 | Calhoun et al. | 134/104.4 X |
| 3,793,802 | 2/1974 | Hardt | 55/DIG. 38 X |
| 3,948,213 | 4/1976 | Hoyer et al. | |
| 4,208,454 | 6/1980 | Reed et al. | |
| 4,721,516 | 1/1988 | Barsacq | 15/353 X |
| 4,846,894 | 7/1989 | Clem et al. | 15/316.1 X |

FOREIGN PATENT DOCUMENTS 2025034 1/1980 United Kingdom .................. 15/304

Primary Examiner—Frankie L. Stinson
Attorney, Agent, or Firm—Beveridge, DeGrandi & Weilacher

[57] ABSTRACT

An apparatus and a method are disclosed for the removal and the recovery of washcoat remaining in the channels of freshly coated monolithic or honeycombed catalytic carriers. The carrier is inserted into a chamber from above and tightly fitted therein at least with the lowest part of the carrier therein. The chamber is fitted with a collection area and a runoff located thereunder. The runoff leads via a shutoff valve into a separation vessel under a vacuum. The opening and closing of the shutoff valve causes air to be aspirated through the carrier channels, which are open at the top or are gradually opened by means of a slotted slide. This action causes the washcoat remnants to be transferred into the separation vessel, where they can be collected in the sump and are then pumped off. The apparatus can be used in systems for manufacturing catalysts for cleaning exhaust gases.

29 Claims, 2 Drawing Sheets

APPARATUS AND METHOD FOR REMOVING WASHCOAT REMAINING IN THE CHANNELS OF FRESHLY COATED MONOLITHIC OR HONEYCOMBED CATALYST CARRIERS AND USE OF THE APPARATUS

INTRODUCTION AND BACKGROUND

The present invention relates to an apparatus a method for removing washcoat remaining in the channels of freshly coated monolithic or honeycombed catalytic carriers those carriers.

Monolithic or honeycombed substrates used for the preparation of exhaust gas purification catalysts are well known and can be made of ceramic or metal. Any such substrates can be treated in accordance with the herein described invention.

During the manufacture of monolithic or honeycombed catalysts, e.g. for the cleaning of automobile or industrial exhaust gases, the catalysts are usually coated with a film of a high surface-area, finely divided and porous ceramic metal oxide such as $\gamma$-$Al_2O_3$ for increasing the carrier surface. This coating deposited on the substrate is referred to in the industry as a "washcoat". This coating operation is usually performed by spraying or by an immersion method using a suspension of the metal oxide. An important phase of the manufacturing operation resides in the removal of the non-absorbed washcoat remaining in the channels of the freshly coated, monolithic or honeycombed catalst carriers. The channels cannot be clogged with excess washcoat as it will interfere with the stream of exhaust gas which passes through such devices in actual installations. Up to the present time, this removal step was carried out by blowing out the excess washcoat with compressed air, that is, the excess washcoat was removed and blown away from the solid body by means of an impulse or jet of an applied stream of air. This causes fine suspension particles in droplet form to be produced; i.e. an aerosol effect.

These particles can not be completely caught in storage tanks or the like with reasonable technical expense and effort so that in the course of the operating time not inconsiderable contaminations of the system occur as a result of being coated with dried washcoat. This can progress to such an extent that the mechanical functioning of the components of the system is adversely affected. This problem can be counteracted only with a considerable and periodic cleaning effort. In addition, especially finely atomized washcoat can result in the formation of an aerosol and adversely affect the surrounding. This must be counteracted by the installation of specially adapted exhaust devices.

As a result of these recognized problems in the industry, there was an urgent need for an improved method of operation which could also be automated.

SUMMARY OF THE INVENTION

An object of the invention is to provide an apparatus for removing and recovering washcoat remaining in the channels of freshly coated, monolithic or honeycombed catalyst carriers. The apparatus features a chamber which surrounds at least the lower outer surface or exterior jacket of the carrier in sealing engagement and forms a collection zone space with a drain runoff located under the carrier. The chamber for containment of the carrier device can also extend upwardly to completely surround the carrier except for the top or upper frontal surface of the carrier. Optionally, a plate is positioned to rest in a sealing manner directly on the upper front surface of the carrier positioned in the chamber. Alternatively, the plate rests on the chamber wall top edge projecting just above the top front surface of the carrier. The plate can be moved in sliding manner over the top of the carrier located in the chamber. The moveable plate is provided with one or several ventilation slots which are capable of successively being in open relation with all channels of the carrier. Connected by a pipeline to the collection chamber is a separation vessel for the separation and removal of washcoat. The upper portion of the separation vessel is connected to a pipeline from the drain of the collection zone for conducting the washcoat and air. This pipeline is also provided with a suction valve. The upper portion of the separation vessel is also connected to an exhaust-air line which in turn is connected to an induced-draught blower. In the bottom of the separation vessel, there is a drain which communicates with a liquid pump for removal of the separated liquid excess washcoat.

A sealing sleeve formed of an elastic, inflatable hollow body can be used for the seal between the carrier outer jacket surface and the collection chamber wall. Compressed air is used to pump up the sealing sleeve to form the airtight seal.

The apparatus can be operated with a carrier in position where the front surface, which is oriented towards the top of the apparatus remains constantly open. However, it is also possible and advantageous as regards the uniformity of the removal of the washcoat to operate the apparatus with the retaining chamber extending its vertical side walls upwardly with its upper top edge just slightly above the upper surface of the carrier positioned in the chamber. The chamber can be of any convenient configuration; e.g. round or square. The said chamber makes it possible, when used in conjunction with a slotted plate covering it, to separately freely expose at a time one section, of the front carrier surface formed of one or more channels of excess washcoat. This can be done in a sequential manner, one section after the other.

The previously unavoidable contamination of the environment with blown-out washcoat spray can be reliably avoided by means of the spatially enclosed connection between carrier containment chamber and the separating or removal vessel. The apparatus can take the form of various embodiments.

In an embodiment where a movable plate is used, it can be arranged so that it can be moved linearly across the top surface of the carrier, in which case the ventilation slot in the plate is vertically oriented to the direction of plate motion and thus lines up in length according to the largest diameter of the carrier.

The ability of the movable plate to shift linearly and perpendicularly with respect to the channels in the carrier can be assured by a slotted plate which is pressed against the upper edge of the chamber and is connected by a pressure-spring means to moveable means such as a truck or sliding carriage which runs on both sides of the chamber and on rails located above the chamber.

It is also possible to design and mount a slotted plate as a rotary slide, in which instance the slot length corresponds to the greatest radius of the carrier. Each ventilation slot in the plate can be at least as wide as the greatest inside diameter of a monolithic channel.

It is preferable, if several slots are present, that they are arranged parallel to each other.

No limitations are placed on the shape of the separation vessel. However, the use of a cyclone as separation vessel for the separation or removal of excess washcoat product is provided herewith as an advantageous variant of the invention.

A further object of the invention is to provide a method for removing and recovering washcoat remaining in the channels of freshly coated, monolithic or honeycombed catalytic carriers, especially with the use of the above described apparatus. The method is characterized in that the catalytic carrier is inserted into the excess washcoat collection chamber in sealing engagement with the walls of said chamber. The shutoff valve is closed and then the suction-removal valve is opened at least once. A slotted plate is optionally moved over the upper front surface of the carrier. Air is removed by suction in a continuous manner from the washcoat/air mixture transferred from the collection chamber into the separation or removal vessel. The liquid phase which collects in the separation vessel as a result thereof is pumped off either continuously or in an alternating manner.

Still further, an object of the invention resides in the use of the described apparatus in a system for manufacturing monolithic or honeycombed catalysts for cleaning exhaust gas.

BRIEF DESCRIPTION OF THE DRAWINGS

The invention will be further understood with reference to the drawings wherein.

DETAILED DESCRIPTION OF THE INVENTION

Figure 1:
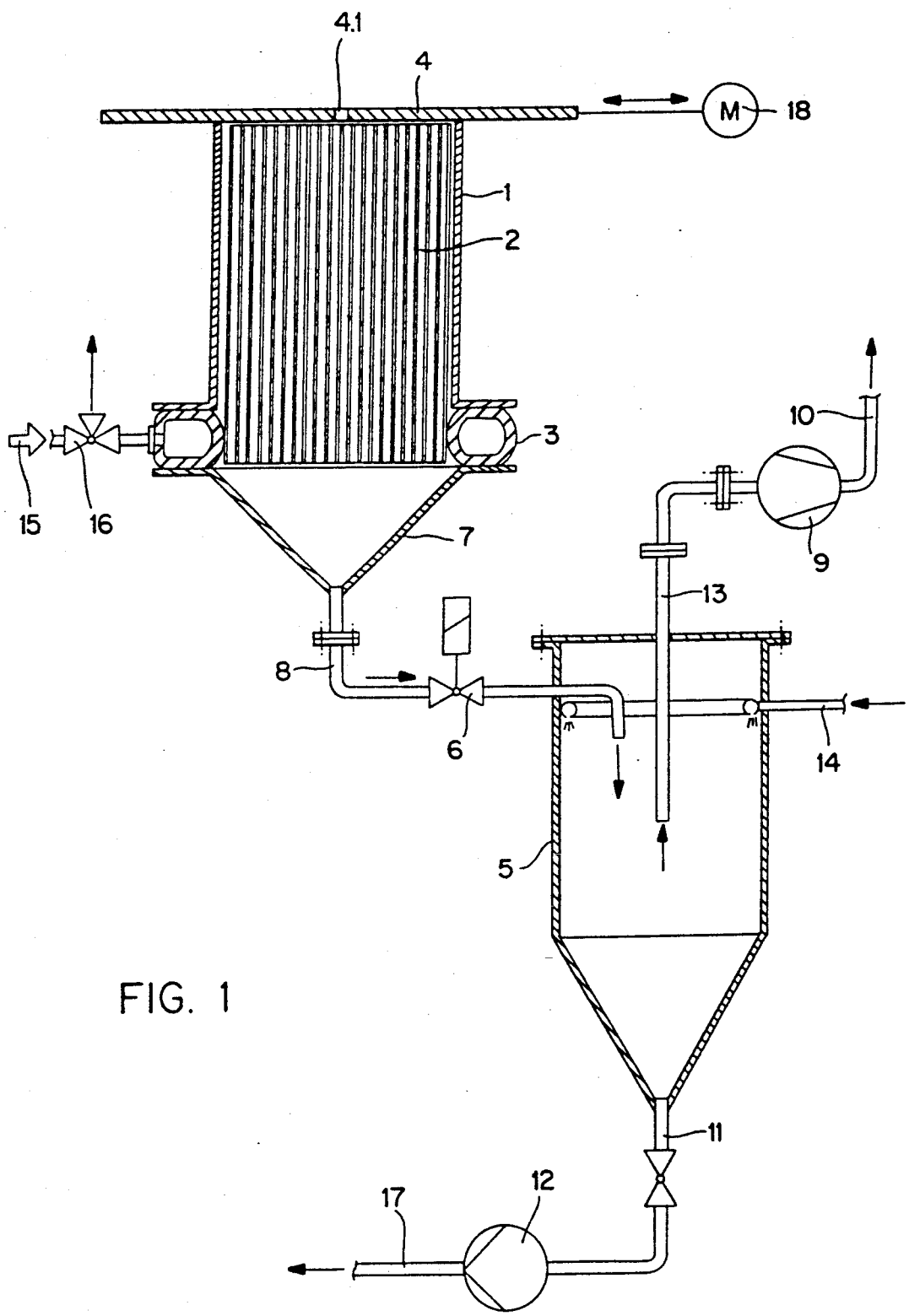
FIG. 1 shows a schematic representation of an advantageous embodiment of the apparatus fitted with a movable slotted plate.

According to FIG. 1, the apparatus of the invention includes a carrier containment collection chamber 1 which receives carrier 2 and seals it off at least at the lower end thereof with inflatable sealing sleeve 3. The flat movable slotted plate 4 rests on the edge of collection chamber 1. As shown, the height of the vertical chamber wall is only slightly higher than the height of the monolithic carrier and thereby forms a slight space between the plate and the front surface of the carrier (play of <1 mm). However, in an alternate embodiment, the chamber may hold or retain the carrier at the lower end of the carrier only.

The separation vessel 5 for the separation of the washcoat/air mixture is connected in series to collection chamber 1. Runoff area 7 located below the chamber 1 functions to collect the excess washcoat suspension and communicates with pipeline 8. The latter communicates with suction removal valve 6. A line runs from the latter to separation vessel 5.

The sleeve 3 is made of any suitable elastic material that can be inflated using a source of compressed air. It functions to form a seal between the chamber walls and the runoff area (7). As the sleeve inflates, it forms a tight seal with lower edge of the chamber wall and the runoff area (7).

Vacuum generator 9 conveys the exhaust air via lines 13 and 10 to the surroundings. Water is sprayed into the separation vessel via line 14. The supply of compressed air 15 effects the seal between sleeve 3 and carrier 2 and is controlled by valve 16. The washcoat suspension passes via drain runoff line 11 designed as a nozzle with stirrer means pump 12 to further processing 17.

The operation of the apparatus of the invention is as follows:

The monolithic or honeycombed carrier 2 is placed in the open or opened holding chamber 1. The insertion takes place with suction-removal valve 6 closed. Then, valve 16 is opened for supplying compressed air 15 for sealing the carrier jacket in relation to chamber 1 by means of sealing sleeve 3 consisting of an elastic material. At the same time, vacuum generator 9 creates a vacuum in separation vessel 5 via induced draught 13.

A vacuum is produced in carrier interior 2 and in the channels thereof by a single or multiple openings, e.g. pulsating, of valve 6. As a result excess washcoat suspension and air are collected in the washcoat suspension runoff area 7 and conveyed by pipeline 8 to separation vessel 5. The air is continuously removed by suction from separation vessel 5 via line 13, pump 9, and line 10. The accumulating liquid phase is constantly or alternatingly pumped off via pipeline 11 and pump 12, then supplied to further processing in line 17. The spraying in of water in conduit 14 assures a suitable regulation of the viscosity of the suspension to be pumped off.

After valve 6 has been opened, slotted plate 4 is moved by motor drive 18 linearly over the front carrier surface at a close interval. Slot width and motion speed can be variably dimensioned.

Figure 2:
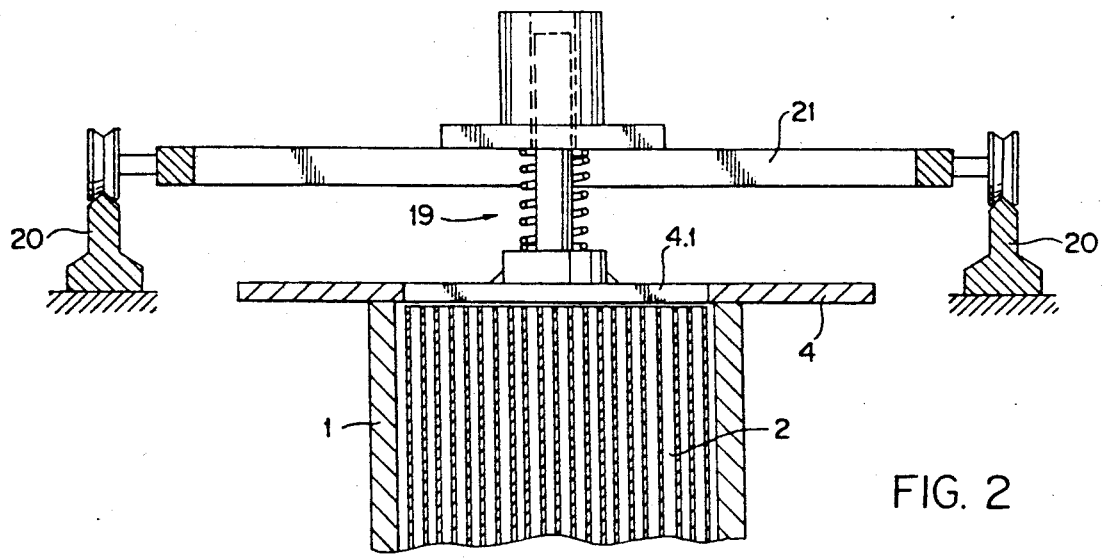
FIG. 2 shows a detail of the upper section of the monolithic insertion chamber of FIG. 1 with the structure for moving the plate located above.

FIG. 2 shows a slotted plate 4 which is pressed against the upper edge of the holding chamber 1 and is connected via pressure-spring arrangement 19 to truck 21 which runs on rails 20 located on both sides of chamber 1 and above the latter.

Figure 3:
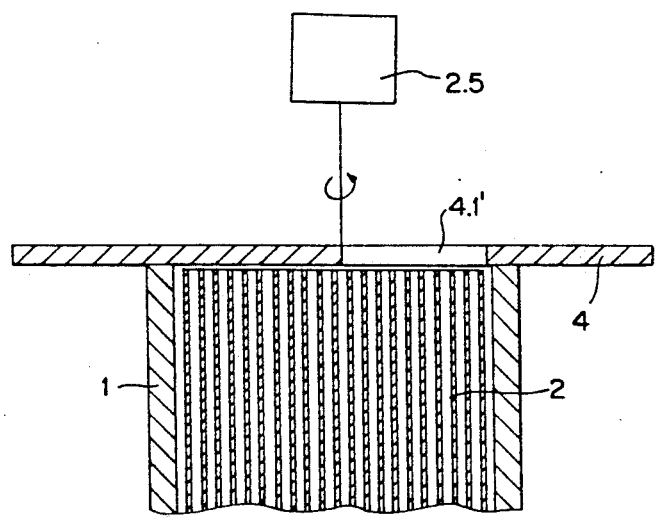
FIG. 3 shows another embodiment of the invention featuring a rotary sliding plate and schematically illustrated rotary sliding means.

FIG. 3 shows a cut away cross-sectional view of another embodiment of the invention wherein rotary sliding means 25 rotates plate 4 with ventilation slot 4.1 extending for the radius of carrier 2.

Figure 4:
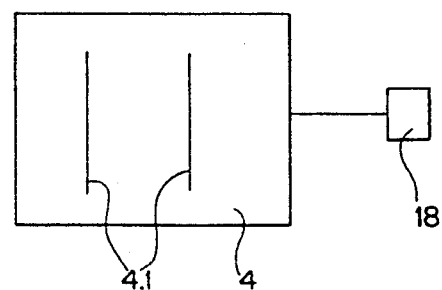
FIG. 4 shown in schematic fashion a sliding plate with multiple ventilation slots.

FIG. 4 shown schematically the previously described embodiment of the present invention which features a plurality of ventilation slots 4.1 formed in plate 4.

Further variations and modifications of the invention will be apparent to those skilled in the art from the foregoing and are intended to be encompassed by the claims appended hereto.

German priority application P 38 03 579.0-43 is relied on and incorporated herein by reference.

We claim:

1. An apparatus for removing and recovering a washcoat suspension of metal oxide remaining in channels of a freshly coated monolithic or honeycombed catalytic carrier, comprising:
   a holding chamber (1) adapted to surround at least a lower jacket surface of a carrier (2) placed therein, and said chamber including a sealing device for forming a sealing relationship with the carrier placed in said chamber, and said chamber being further provided with a collection area with runoff (7) located in a lower portion of the chamber so as to be under the carrier placed in said chamber;
   a pipeline;

a separation vessel; said pipeline extending between said separation vessel and said runoff for the passage of washcoat and air from said runoff to said separation vessel for separation therein;

a suction removal valve (6);

an exhaust-air line fitted to said separation vessel (5);

an induced-draught blower, said exhaust air line being connected to said induced-draught blower and said suction removal valve being positioned so as to prevent passage of air past said induced-drought blower when in a first position;

a runoff line and liquid pump, said runoff line extending from a bottom of said separation vessel (5) and said runoff line (11) being in communication with said liquid pump (12);

a plate, positioned on or above the carrier when the carrier is placed within said chamber, said plate including at least one ventilation slot; and moving means for moving said plate with respect to the carrier positioned below.

2. The apparatus according to claim 1, wherein said plate is adapted to rest in a sealing manner on an upper front surface of the carrier placed in said chamber.

3. The apparatus according to claim 1, wherein said plate is adapted to rest in a sealing manner on an upper edge of the holding chamber which upper edge projects above the carrier positioned within said chamber.

4. The apparatus according to claim 1, wherein said means for moving said plate moves said plate linearly, and said plate being positioned above the carrier positioned in said chamber and provided with at least one ventilation slot extending transversely to the direction of motion of said plate and corresponding in length to diameter of the carrier placed in said chamber, thus being capable of successively connecting with all channels of the carrier positioned in said chamber.

5. The apparatus according to claim 1, further comprising pressure-spring means, movable means and rails, and wherein said plate is slotted and adapted to be pressed against an upper edge of said chamber and is connected via said pressure-spring means to said movable means which is adapted to run on said rails.

6. The apparatus according to claim 1, wherein said moving means includes rotary sliding means, and wherein said plate is slotted and is mounted to said rotary sliding means so as to be adapted to slidingly rotate relative to said chamber and wherein the slot length corresponds to a radius of the carrier placed in said chamber.

7. The apparatus according to claim 1, wherein said plate has at least one ventilation slot therein which is at least a wide as an inner diameter of any channel contained in the carrier placed in said chamber below said plate.

8. The apparatus according to claim 1 wherein said plate has a plurality of slots arranged parallel to each other.

9. The apparatus according to claim 1, wherein said separation vessel is a cyclone.

10. An apparatus for removing and recovering washcoat suspension remaining in channels of a freshly coated catalytic carrier which has a lower end, an upper end, and an external jacket surface, comprising:

a holding chamber which is dimensioned and arranged to surround at least a lower portion of the external jacket surface of the carrier, said holding chamber including a sealing device adapted to contact the external jacket surface, and said holding chamber further including, at a lower end thereof, a collection area with runoff, said collection area and runoff being dimensioned and arranged so as to be under the carrier when the carrier is positioned within said holding chamber;

a plate positioned on or above the upper end of the carrier, said plate including at least one ventilation slot;

means for moving said plate;

a separation vessel for separating the washcoat and air;

a pipeline connecting said separation vessel to said runoff;

a vacuum generator, said vacuum generator and said sealing device being dimensioned and arranged such that, when said vacuum generator is operating, air is drawn through the ventilation slot in said plate and through one or more channel sin the carrier underlying the ventilation slot and containing the excess washcoat suspension, and said vacuum generator being positioned so as to draw a mixture of washcoat suspension and air from said runoff, through the pipeline, and into said separation vessel;

an exhaust line fitted to said separation vessel for exhausting air separated in said separation vessel;

a runoff line fitted to said separation vessel for the removal of washcoat suspension separated in said separation vessel.

11. The apparatus according to claim 10 said means for moving said plate moves said plate linearly and wherein the carrier is cylindrical and has a diameter, and said at least one ventilation slot extends in a direction transverse to a direction of movement of said plate and wherein said slot length corresponds to the diameter of the carrier positioned within said holding chamber.

12. The apparatus according to claim 11 further comprising a water spraying device positioned in said separation vessel and a fluid pump in communication with said runoff line.

13. The apparatus according to claim 10 wherein said plate is supported by said holding chamber nd there is a space between the upper end of the carrier and said plate of less than 1 mm.

14. The apparatus according to claim 10 wherein said means for moving said plate includes plate rotation means, and wherein the carrier is cylindrical and has a radius and the slot length corresponds to the radius of the carrier.

15. The apparatus according to claim 10 wherein said vacuum generator is in line with said exhaust line.

16. The apparatus according to claim 10 further comprising a water spraying device positioned in said separation vessel and a fluid pump in communication with said runoff line.

17. The apparatus according to claim 10 wherein said sealing device includes an inflatable seal surrounding the external jacket surface.

18. An apparatus for removing and recovering washcoat suspension remaining in channels of a freshly coated catalytic carrier which has a lower end, an upper end, and an external jacket surface, comprising:

a holding chamber which is dimensioned and arranged to hold the carrier, said holding chamber including a sealing device adapted to surround and come in contact with the external jacket surface of the carrier, and said holding chamber further including, at a lower end thereof, a collection area with runoff hat is dimensioned and arranged so as to be under the carrier when the carrier is positioned within said holding chamber;

a plate, said plate including a ventilation slot, and said plate being positioned above or on the upper end of the carrier;

means for moving said plate; and a vacuum generator, said vacuum generator and sealing device being dimensioned and arranged such that, when said vacuum generator is operating, air is drawn through the ventilation slot and into one or more underlying channels of the carrier, and said vacuum generator also being dimensioned and arranged to draw a resultant mixture of air and excess washcoat out through the runoff.

19. An apparatus according to claim 18 wherein said moving means moves said plate linearly with respect to an upper surface of a carrier positioned in said chamber.

20. An apparatus according to claim 18 further comprising a separating vessel and a pipeline extending between said separator vessel and said runoff, said apparatus further comprising a valve positioned in line with the pipe extending between said runoff and said separation vessel.

21. An apparatus according to claim 20 wherein said separation vessel is a cyclone having water spraying means.

22. An apparatus according to claim 18 wherein said holding chamber is adapted to receive a cylindrical carrier and said ventilation slot is of a length which corresponds with the diameter of the carrier.

23. An apparatus according to claim 22 wherein said moving means moves said plate linearly along a plane parallel with the upper end of the carrier.

24. An apparatus according to claim 23 wherein said ventilation slot has a width which is at least a s wide in a direction of movement of the plate as an underlying channel positioned below the plate.

25. An apparatus according to claim 18 wherein said moving means moves said plate linearly along a plane parallel with the upper end of the carrier.

26. An apparatus according to claim 18 wherein said moving means includes means for rotating said plate, and the carrier is cylindrical with a radius and the ventilation slot is of a length which corresponds to the radius of the carrier.

27. An apparatus according to claim 26 wherein said ventilation slot has a width which is at least as wide in a direction of movement of the plate as an underlying channel positioned below the plate.

28. An apparatus according to claim 18 wherein said seal extends about the lower portion of the external jacket surface of the carrier.

29. An apparatus according to claim 18 wherein the one or more ventilation slots are dimensioned and arranged so as to be open at all times during the moving of said plate by said plate moving means.

* * * * *